(12) United States Patent
Brandenburger

(10) Patent No.: US 7,048,280 B2
(45) Date of Patent: May 23, 2006

(54) HYDROPNEUMATIC AXLE SUSPENSION FOR VEHICLES HAVING GREATLY VARYING AXLE LOADS

(75) Inventor: Walter Brandenburger, Neuss (DE)

(73) Assignee: Carl Freudenberg KG, Weinheim (DE)

( * ) Notice: Subject to any disclaimer, the term of this patent is extended or adjusted under 35 U.S.C. 154(b) by 33 days.

(21) Appl. No.: 10/620,493

(22) Filed: Jul. 16, 2003

(65) Prior Publication Data
US 2005/0258607 A1 Nov. 24, 2005

(30) Foreign Application Priority Data
Jul. 18, 2002 (DE) ................ 102 32 769

(51) Int. Cl.
B60G 17/00 (2006.01)

(52) U.S. Cl. .............. 280/5.519; 280/6.157; 280/6.159

(58) Field of Classification Search ........ 280/5.519, 280/6.157, 6.159, 124.159, 124.158, 5.504, 280/5.515, FOR 165, FOR 166, FOR 171
See application file for complete search history.

(56) References Cited

U.S. PATENT DOCUMENTS

| 5,116,077 | A | * | 5/1992 | Karnopp et al. ......... 280/5.502 |
| 5,338,010 | A | | 8/1994 | Haupt ...................... 267/64.16 |
| 5,919,240 | A | * | 7/1999 | Ney et al. ..................... 701/37 |
| 6,010,139 | A | * | 1/2000 | Heyring et al. ....... 280/124.104 |
| 6,102,418 | A | * | 8/2000 | Runkel ................. 280/124.106 |
| 6,144,907 | A | * | 11/2000 | Shibuya et al. ................ 701/37 |
| 6,220,613 | B1 | * | 4/2001 | Franzini .............. 280/124.106 |
| 6,302,961 | B1 | * | 10/2001 | Robie et al. ................... 118/66 |
| 6,575,484 | B1 | * | 6/2003 | Rogala et al. ........ 280/124.158 |
| 6,578,855 | B1 | * | 6/2003 | Wallestad ................ 280/6.157 |
| 6,644,096 | B1 | * | 11/2003 | Brandenburger ........... 73/11.04 |
| 6,669,216 | B1 | * | 12/2003 | Elser et al. ........... 280/124.106 |
| 6,786,492 | B1 | * | 9/2004 | Brandenburger ......... 280/5.519 |
| 2002/0157451 | A1 | | 10/2002 | Brandenburger ........... 73/11.04 |
| 2002/0171209 | A1 | | 11/2002 | Brandenburger ......... 280/5.519 |

FOREIGN PATENT DOCUMENTS

| DE | 4120758 | 1/1992 |
| DE | 4242448 | 3/1994 |
| DE | 10107631 | 9/2002 |
| DE | 10107644 | 9/2002 |

* cited by examiner

Primary Examiner—Paul N. Dickson
Assistant Examiner—Toan C. To
(74) Attorney, Agent, or Firm—Davidson, Davidson & Kappel, LLC

(57) ABSTRACT

A hydropneumatic axle suspension for vehicles having greatly varying axle loads, in particular for front axles on tractors having hydraulic suspension cylinders, which are connected to hydropneumatic accumulators having a suspension circuit Z of the cylinder chambers that is pressure-regulated via a level-control device, and a pressure-regulated suspension circuit of the annular spaces for varying the spring rate $C_A$. The axle-spring rate $C_A$ automatically changing via an electromagnetic actuator to increase the ride comfort in accordance with a predefined control mode. Additional, individual variations also being controllable.

11 Claims, 2 Drawing Sheets ized to different load conditions. At the
HYDROPNEUMATIC AXLE SUSPENSION FOR VEHICLES HAVING GREATLY VARYING AXLE LOADS Priority is claimed to German patent application DE 102 32 769.6-21, filed on Jul. 18, 2003.

BACKGROUND

The present invention is directed to a hydropneumatic axle suspension for vehicles having greatly varying axle loads, in particular for front axles on tractors having hydraulic suspension cylinders.

In hydropneumatic axle suspensions, it is customary for a level-control system to be used. As the axle load increases, the ride height of the vehicle is reduced, and a level-control valve is adjusted to allow a hydraulic fluid to be fed via a pressure line into the cylinder chamber of the hydropneumatic actuators until the original level is reached again. As the axle load decreases, the ride height of the vehicle is increased, and the level-control valve connects the cylinder chambers of the hydropneumatic actuators to a discharge line, until the original level is restored.

Besides the level control, vehicles having a high load ratio are equipped with a pressure control for the annular spaces of the suspension cylinders, which, also by varying the pressure level, enables the suspension performance of the vehicles to be adapted to different load conditions. At the present time, the pressure level prevailing in the annular spaces of the suspension cylinders is regulated only as a function of the existing axle load. A suspension system made up of a level control and a pressure control is described in the German Patent Application DE 41 20 758 A1.

From the German Patent DE 42 42 448 C1, an improved hydropneumatic suspension device has become known, where a load-sensing pump is used, and whose level-control device is provided with a valve device which, in response to a static load change, briefly regulates the pressure level of all control lines and supply lines up or down and, in otherwise assumed neutral positions, relieves the lines of pressure, the piston chambers and annular spaces being hermetically sealed off via non-return valves capable of being unblocked.

The non-prepublished German Patent Application DE 101 07 631 discusses a hydropneumatic axle suspension that permits an especially rapid pressure adaptation and, moreover, provides improved driving comfort for the vehicle driver. In the context of this suspension, it is possible to vary the pressure prevailing in the suspension-cylinder annular spaces to yield a different stiffness of the spring characteristic in different load ranges. In the low load range, the pressure in the annular spaces of the suspension cylinders is preferably raised; the result is a spring characteristic having an increased stiffness.

A further improvement in the suspension performance is achieved by an axle suspension as described in the German Patent Application DE 101 07 644 A1, which is likewise not prepublished. In this axle suspension, the pressure-regulating valve used for regulating pressure is designed as a proportionally regulated valve that is controlled by a control current from an electrical control unit. This unit electronically processes both the measured signals from a pressure sensor, which is linked to the piston chambers of the suspension cylinders, as well as functionally dependent signals. In this way, a spring characteristic is achieved that has a constructively predefined curve shape that is dependent upon the load and operating state. The axle-spring rate is continuously adapted, automatically, to the suspended axle load and the working state for every control action.

SUMMARY OF THE INVENTION

An object of the present invention is to devise an economical design approach that is characterized by a small type of construction for a control block of an axle suspension, which will further enhance road travel comfort by providing a spring rate which changes automatically in response to technical road-travel requirements and, additionally, enable the spring characteristic to be hardened on an individual basis for the particular application.

The present invention provides a hydropneumatic axle suspension for vehicles having greatly varying axle loads, in particular for front axles on tractors having hydraulic suspension cylinders, which are connected to hydropneumatic accumulators, having a suspension circuit Z of the cylinder chambers that is pressure-regulated via a level-control device and a pressure-regulated suspension circuit R of the annular spaces, wherein the axle-spring rate ($C_A$) automatically changes via an electromagnetic actuator in accordance with a predefined control mode, and additional variations are controllable.

In accordance with the present invention, the annular space pressure is proportionally regulated between the constant annular-space pressure level to more quickly adapt the pressure of the accumulator, and a proportional valve is linked hydraulically in such a way that an LS control with pressure relief is given for a control pump. In the case of the device according to the present invention, the two suspension circuits of the cylinder chambers and annular spaces are retained in the level position at the adjusted pressure level in a leak-free manner by two pressure-tight 2/2 directional control valves and suitably actuated during the level-control process, thereby eliminating the need for the previously necessary, special non-return valves capable of being hydraulically unblocked. Besides automatically changing the spring rate by automatically regulating the annular-space pressure, it is possible, through external intervention, to deliberately vary the pressure level in the annular spaces, as needed, to be able to optimally adapt the spring rate to existing operating conditions.

It is beneficial for the suspension circuit of the cylinder chambers to be provided with a safety valve to prevent overloading of the accumulators.

A load-sensing pump is preferably used for delivery of pressurized media.

BRIEF DESCRIPTION OF THE DRAWINGS

The present invention is elucidated in the following on the basis of an exemplary embodiment, with reference to the attached drawings, in which.

DETAILED DESCRIPTION

Figure 1:
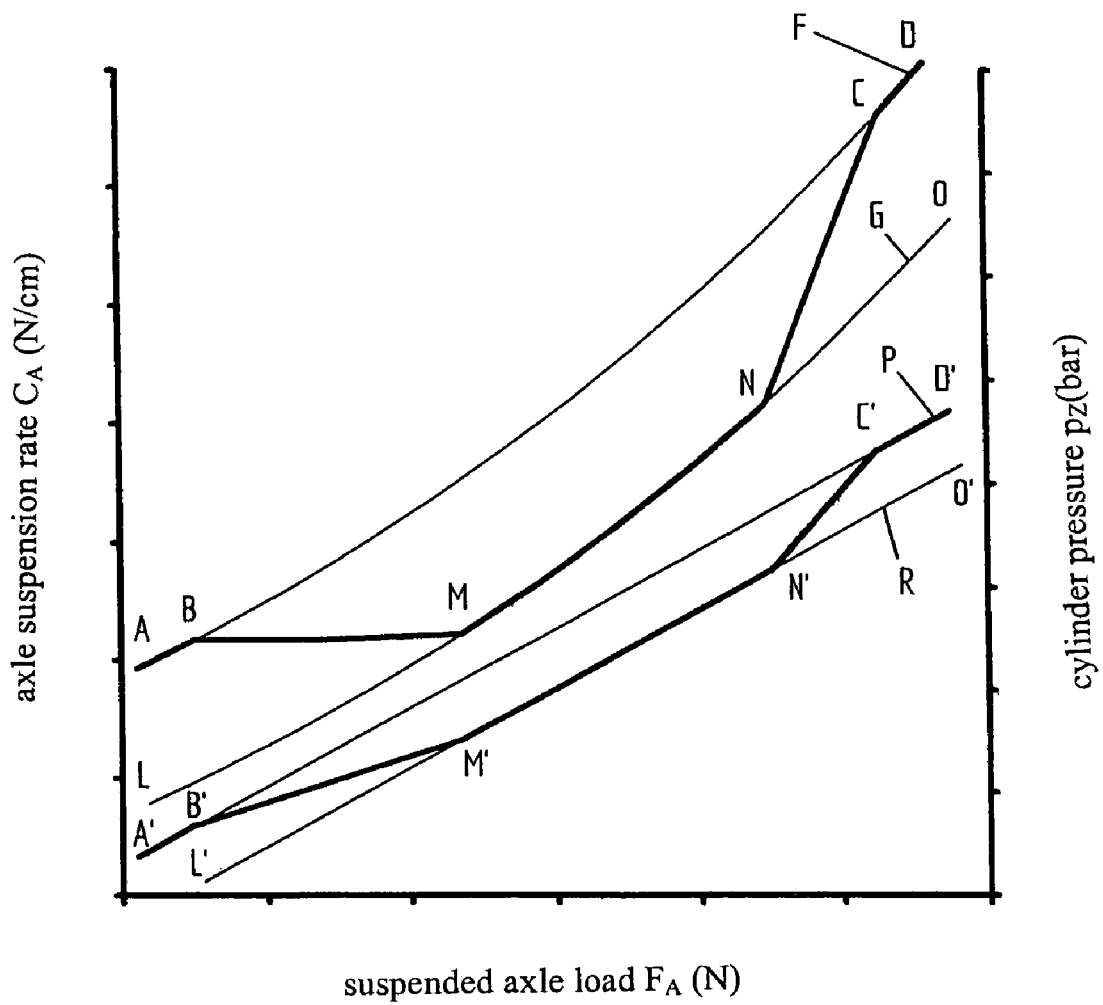
FIG. 1 shows an example of one possible way the axle-spring rate may vary between two spring characteristics and the pressure curve derived therefrom in the cylinder chambers of the suspension cylinders.

In FIG. 1, the curves of spring characteristics F and G exemplify two limiting curves, which are characterized by good suspension performance during road travel within specific axle-load ranges. The scale intervals of axle-spring rate $C_A$ are illustrated to the left of the diagram and those of axle load $F_A$ underneath. For road travel without add-on units and for tractor-trailer operation, the suspension characteristic is set to be soft in curve segment M–N of characteristic curve G, in order to enhance driving comfort in a medium load situation by utilizing spring travel. For travel involving a towed weight with brakes and the associated problem of an oscillating mass, the stiffer spring characteristic curve F is required to avoid pitching oscillations, curve segment A–B being optimized for the unloaded axle and curve segment C–D for the fully loaded axle. Curve segments B–M and N–C form the transitions to the optimized, functionally relevant regions of limiting curves F and G. The two curve characteristics P and R represent cylinder pressures $P_Z$ that are plotted over the axle loads. Their scale interval is indicated on the right side of the diagram. These pressure values have a direct relationship with axle kinematics, cylinder number, cylinder size, and with the mass to be suspended, curve P representing the pressure level of the greatest annular space pressure and curve R that of the lowest annular space pressure. In the context of automatic annular-space pressure regulation as a function of axle load, curve characteristic A'–D', drawn with a thicker line, specifies that the annular-space pressure in the low load range of A'–B' is retained at a constant level at the upper pressure value, and, from B' to M', is lowered proportionally to point M', to the lowest pressure level. This low annular-space pressure level is adjusted to a constant level over the load range of curve segment M' to N', and rises again proportionally in segment N' to C', to the high level, which remains constant from point C' to D'. In accordance with the described control mode, one obtains spring-rate characteristic A–D, sketched as a heavier line, which is set for road travel comfort. If the spring function is not switched off for agricultural work, then a noticeably harder spring rate is necessary in the middle load range. For this, one has the option of intervening externally in the automatic, load-dependent control mode, thereby enabling the spring rate to be adjusted to an individual value within points B, M, N, C, and the suspension performance to be optimized for the particular application.

Figure 2:
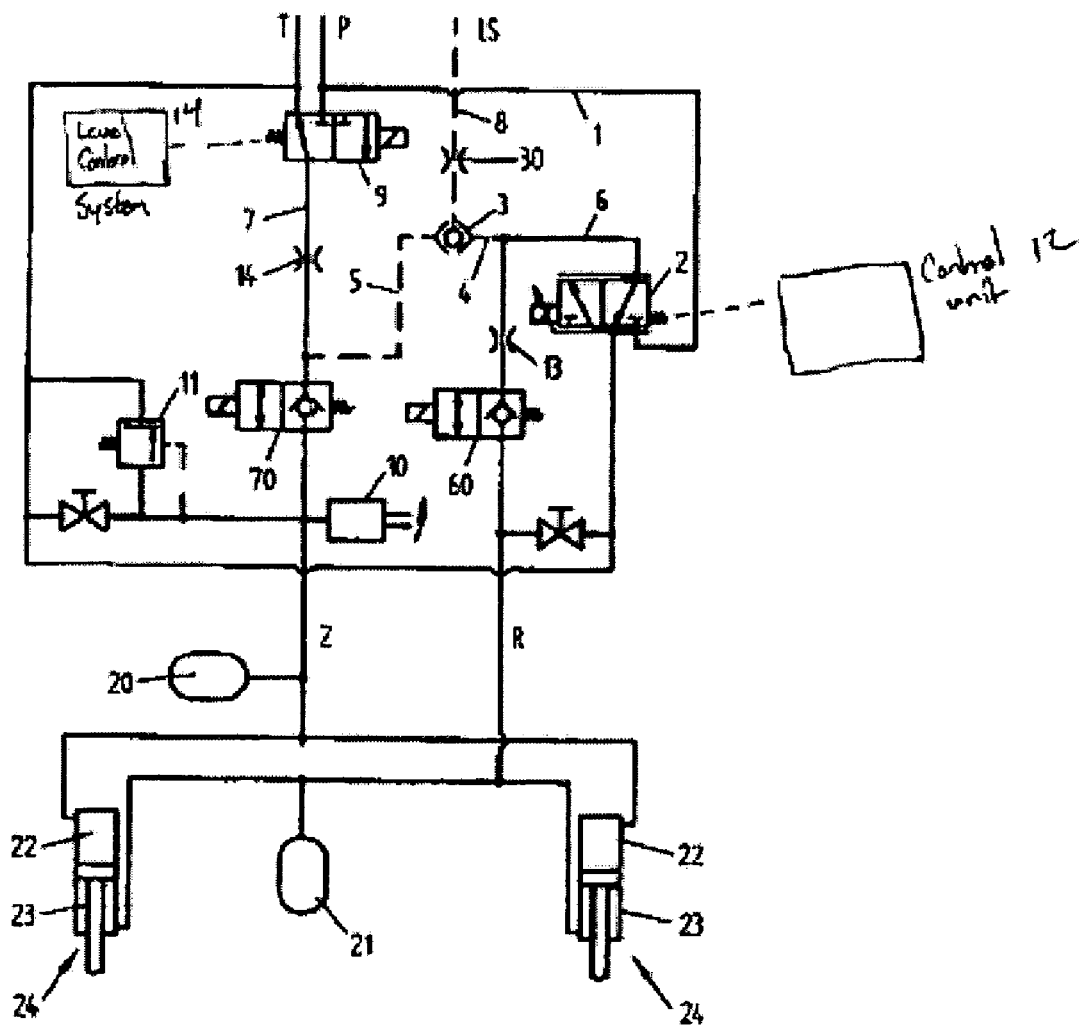
FIG. 2 shows a circuit diagram for the axle suspension in accordance with the present invention.

FIG. 2 illustrates a circuit diagram for carrying out the present invention. Suspension cylinders 24 and accumulators 20 and 21 are linked in a generally known way via supply lines Z and R. In this context, supply line Z is connected to cylinder chambers 22 and supply line R to annular spaces 23 of suspension cylinders 24. Terminal connection P is linked to a load-sensing pump, while terminal connection T leads to a reservoir. The pump is permanently connected via supply line 1 to proportionally working pressure-regulating valve 2. Pressure-regulating valve 2 is a proportional 3/2 directional control valve, which increases and lowers, respectively, the pressure prevailing in annular spaces 23 as a function of the control current. Shuttle valve 3 is linked via control lines 4 and 5, by way of supply lines 6 and 7, to annular spaces 23 and cylinder chambers 22, respectively, of suspension cylinders 24. The higher pressure prevailing as the case may be in one of lines 6 or 7 is applied to control line 8 leading to the load-sensing pump, and the load-sensing pump is controlled accordingly. If the level position of the vehicle is too low, 3/2 directional control valve 9 is actuated by a level-control system 14, proportional pressure-regulating valve 2 is energized by control current, which is derived as a processed control current from the dependency on the electric pressure signal from pressure sensor 10 in an electrical control unit 12, and 2/2 directional control valve 60 is actuated. As soon as the pressure prevailing in supply line 7 downstream from orifice valve 14 reaches the pressure level of suspension circuit Z, pressurized oil flows through the non-return valve from 2/2 directional control valve 70 into cylinder chambers 22. At the same time, annular spaces 23 are directly linked via actuated 2/2 directional control valve 60 to supply line 6, so that the pressure prevailing in the annular space may be adapted to the pressure level adjusted by pressure-regulating valve 2 via orifice valve 13. Shuttle valve 3, via which control lines 5 and 4 are connected to the two pressure levels of suspension circuits Z and R, applies the highest pressure value to LS control line 8. As soon as the level position is reached, the control action ends, and the level-control system switches all valves to the neutral, off-circuit position. Suspension circuits Z and R are hydraulically blocked by the currentless 2/2 directional control valves, and the control pressure prevailing in LS control line 8 is able to be relieved by way of supply lines 6 and 7 switched to the unpressurized condition. If the level position is too high, then the function whereby the pressure level is regulated down, is actuated via the level-control system, in that both 2/2 directional control valves 70 and 60 are energized, and control current is supplied to proportional pressure-regulating valve 2, allowing pressurized oil to flow off from cylinder chambers 22 via orifice valve 14. The annular-space pressure adapts itself, as previously described in the context of regulating the pressure level up, until the level position is reached, and the status is then switched to neutral. In the context of the regulating functions, orifice valves 14 and 13 are synchronized in such a way that, when the level position is reached, the pressure prevailing in the suspension circuit of cylinder annular spaces 23 also adapts itself to the pressure level to be adjusted. Through orifice valve 30 in LS line 8, one is able to build up the control pressure of external functional elements.

If, deviating from the control mode, a harder spring rate is required, then an external switch point signal is transmitted to the electrical control unit 12, which adapts and sets the appropriate control current and switches on proportional pressure-regulating valve 2. Proportional pressure-regulating valve 2 applies the given pump pressure to supply line 6. The pump pressure is then further directed via control line 4 and shuttle valve 3 to LS control line 8, so that the control pump builds up pressure to the control pressure value. As soon as the pressure prevailing in delivery line 6 slightly exceeds the pressure level in annular spaces 23, pressurized oil begins to flow into cylinder annular spaces 23, resulting in a reduction of the vehicle-body ride height. The level-control system thereby switches to the function whereby the pressure level is regulated up, until the level position is reached. All of the regulating functions that follow at this point proceed automatically in the manner just described, but with the difference that proportional pressure-regulating valve 2 is always energized by the same, initially set control current, so that when the switch is made to the neutral position, the suspension is always set with the desired spring rate for the particular application. To be able to switch the hydropneumatic suspension back again to the automatic control mode of road travel, the introduced external switch point signals must first be cleared, and pressure-regulating valve 2 must be activated by the control current that is influenced only by the pressure signal from pressure sensor 10. At the same time, 2/2 directional control valve 60 must be actuated to enable the pressure level in annular spaces 23 to be adapted to the pressure in supply line 6 that has been regulated to a lower level. As soon as the pressure level of annular spaces 23 falls, suspension cylinders 24 are extended out, and the axle is subsequently adjusted to the level position. All further control actions are then carried out in accordance with the preset, automatic control mode.

To protect accumulator 20 from overloading, pressure-regulating valve 11 is placed in suspension circuit Z.

What is claimed is:

1. A hydropneumatic axle suspension having an adjustable axle-spring rate for a vehicle having varying axle loads, comprising:
   a first hydropneumatic accumulator;
   a hydraulic suspension cylinder having a cylinder chamber and an annular space;
   a first pressure-regulated suspension circuit connecting the cylinder chamber to the first hydropneumatic accumulator;
   a first regulating valve for regulating the first pressure-regulated suspension circuit;
   a level-control device for regulating a pressure in the first suspension circuit; a second hydropneumatic accumulator;
   a second pressure-regulated suspension circuit connecting the annular space to the second hydropneumatic accumulator;
   a second regulating valve for regulating the second pressure-regulated suspension circuit; and
   an electromagnetic actuator configured to automatically change the axle spring rate according to a predefined control mode.

2. The hydropneumatic axle suspension as recited in claim 1 further comprising an electronic control unit linked to the electromagnetic actuator and configured to process electronic measured data.

3. The hydropneumatic axle suspension as recited in claim 1 wherein the axle-spring rate is adjustable between a first and a second predefined spring rate using external control signals.

4. The hydropneumatic axle suspension as recited in claim 1 wherein the electromagnetic actuator includes a proportional pressure-regulating valve configured to proportionally regulate the axle-spring rate between a first and a second constant pressure value.

5. The hydropneumatic axle suspension as recited in claim 4 wherein the proportional pressure-regulating valve is further configured to regulate the axle-spring rate to a selectable constant pressure.

6. The hydropneumatic axle suspension as recited in claim 1, wherein the first regulating valve includes a first 2/2 directional control valve for regulating the first suspension circuit and the second regulating valve includes a second 2/2 directional control valve for regulating the second suspension circuit.

7. The hydropneumatic axle suspension as recited in claim 6, wherein the first and second 2/2 directional control valves hydraulically block the first and second suspension circuits when a level position is reached.

8. The hydropneumatic axle suspension as recited in claim 1, wherein the hydropneumatic axle suspension is for a front axle of a tractor.

9. A hydropneumatic axle suspension having an adjustable axle-spring rate for a vehicle having varying axle loads, comprising:
   a first hydropneumatic accumulator;
   a hydraulic suspension cylinder having a cylinder chamber and an annular space;
   a first pressure-regulated suspension circuit connecting the cylinder chamber to the first hydropneumatic accumulator;
   a level-control device for regulating a pressure in the first suspension circuit a second hydropneumatic accumulator;
   a second pressure-regulated suspension circuit connecting the annular space to the second hydropneumatic accumulator;
   an electromagnetic actuator configured to automatically change the axle spring rate according to a predefined control mode, wherein the electromagnetic actuator includes a proportional pressure-regulating valve configured to proportionally regulate the axle-spring rate between a first and a second constant pressure value; and
   a shuttle valve and a first pressure line hydraulically linking the shuttle valve to the pressure-regulating valve so that when the pressure-regulating valve is not energized by a current, the shuttle valve is able to relieve the first pressure line of pressure.

10. The hydropneumatic axle suspension as recited in claim 9 further comprising an orifice valve, a 2/2 directional control valve and a supply line, a control line of the shuttle valve being connected between the 2/2 directional control valve and the orifice valve for sensing a pressure in the cylinder chambers.

11. A hydropneumatic axle suspension having an adjustable axle-spring rate for a vehicle having varying axle loads, comprising:
   a first hydropneumatic accumulator;
   a hydraulic suspension cylinder having a cylinder chamber and an annular space;
   a first pressure-regulated suspension circuit connecting the cylinder chamber to the first hydropneumatic accumulator;
   a level-control device for regulating a pressure in the first suspension circuit; a second hydropneumatic accumulator;
   a second pressure-regulated suspension circuit connecting the annular space to the second hydropneumatic accumulator;
   an electromagnetic actuator configured to automatically change the axle spring rate according to a predefined control mode; and
   a first orifice valve installed in a supply line of the first suspension circuit and a second orifice valve installed in a supply line of the second suspension circuit, the orifice valves being used for adapting a control time of the change in the axle-spring rate.

* * * * *